US005167915A

United States Patent [19]

Yamashita et al.

[11] Patent Number: 5,167,915

[45] Date of Patent: Dec. 1, 1992

[54] PROCESS FOR PRODUCING A RARE EARTH-IRON-BORON MAGNET

[75] Inventors: Fumitoshi Yamashita, Ikoma; Masami Wada, Hirakata; Takeichi Ota, Katano, all of Japan

[73] Assignee: Matsushita Electric Industrial Co. Ltd., Osaka, Japan

[21] Appl. No.: 675,737

[22] Filed: Mar. 27, 1991

[30] Foreign Application Priority Data

Mar. 30, 1990 [JP] Japan .................................... 2-86547

[51] Int. Cl.[5] ........................ B29C 43/02; B29C 67/02

[52] U.S. Cl. ...................................... 419/12; 148/101; 148/302; 264/27; 264/125; 264/332; 264/DIG. 58; 419/52

[58] Field of Search ................. 264/27, DIG. 58, 125, 264/332; 148/101, 302; 419/12, 52

[56] References Cited

U.S. PATENT DOCUMENTS

| | | | |
|---|---|---|---|
| 3,213,491 | 10/1965 | Craig | 264/27 |
| 3,387,079 | 6/1968 | Hoppe et al. | 264/27 |
| 3,567,903 | 3/1971 | Parker | 419/52 |
| 4,832,891 | 5/1989 | Kass | 264/236 |
| 4,834,812 | 5/1989 | Ghandehari | 148/101 |
| 4,881,985 | 11/1989 | Brewer et al. | 148/103 |
| 4,921,553 | 5/1990 | Tokunga | 148/302 |
| 4,929,415 | 5/1990 | Okazaki | 419/52 |
| 4,952,331 | 8/1990 | Okimoto | 264/DIG. 58 |
| 4,996,023 | 2/1991 | Flipse et al. | 419/12 |

FOREIGN PATENT DOCUMENTS

| | | |
|---|---|---|
| 0378698 | 7/1989 | European Pat. Off. . |
| 59-64739 | 4/1984 | Japan . |
| 60-100402 | 6/1985 | Japan . |
| 1-077102 | 7/1989 | Japan . |
| 1-175705 | 10/1989 | Japan . |
| WO8912902 | 12/1989 | PCT Int'l Appl. . |

OTHER PUBLICATIONS

IEEE Transactions on Magnetics, vol. 26, No. 5, Sep. 1990, New York US pp. 2601-2603; M. Wade et al., "New Method of making Nd-Fe-Co-B Full Dense Magnet".

Search Report for EPO application No. EP-91302848.6 dated Jun. 21, 1991.

*Primary Examiner*—Jan H. Silbaugh
*Assistant Examiner*—Brian J. Eastley
*Attorney, Agent, or Firm*—Ratner & Prestia

[57] ABSTRACT

A process for producing a rare earth-iron-boron magnet, which includes the steps of: (1) charging a melt spun powder of a rare earth-iron-boron magnet into at least one cavity, which is confined by a pair of electrodes inserted into a hole of an electrically non-conductive ceramic die; (2) subjecting the melt spun powder to a non-equilibrium plasma treatment, under a reduced atmosphere of $10^{-1}$ to $10^{-3}$ Torr, while applying a uniaxial pressure of 200 to 500 kgf/cm$^2$ to the melt spun powder in the direction connecting the electrodes interposed between a pair of thermally insulating members, thereby fusing the melt spun powder; and (3) heating the fused melt spun powder to a temperature higher than or equal to its crystallization temperature by transferring a Joule's heat generated in the thermally insulating members by passing a current through the members to the melt spun powder thereby causing the plastic deformation of the melt spun powder to form a rare earth-iron-boron magnet.

2 Claims, 1 Drawing Sheet

PROCESS FOR PRODUCING A RARE EARTH-IRON-BORON MAGNET

BACKGROUND OF THE INVENTION

1. Field of the Invention:

This invention relates to a process for producing a bulk permanent magnet such as one used in a compact motor with high output power, and more particularly, it relates to a process for producing a bulk permanent magnet directly from a melt spun powder of a rare earth-iron-boron material. The resulting bulk permanent magnet has an excellent demagnetizing force which is resistant to a strong demagnetizing field derived from an armature reaction. The bulk permanent magnet also has a high coercive force and a high residual induction which is concerned with an improvement in the output power of motors. According to the process of this invention, bulk permanent magnets having such excellent characteristics can be produced with high dimensional precision and high productivity.

2. Description of the Prior Art:

A permanent magnetic material in the non-equilibrium state or a metastable permanent magnetic material can be obtained by rapid solidification of a rare earth-iron-boron material with a melt spinning technique to solidify at least one part of the melted alloy without causing its crystallization. It is known that the resulting permanent magnetic material has a high coercive force and a high residual induction due to its non-equilibrium or metastable state (Japanese Laid-open Patent Publication No. 59-64739). However, because the permanent magnetic material obtained by such a melt spinning technique is a powder in the form of thin ribbon or flake, it must be fused by a certain method to form a bulk permanent magnet such as one used in a motor.

Examples of the method for fusing a melt spun powder include a powder metallurgy such as a non-pressure sintering process. However, when a melt spun powder of a rare earth-iron-boron material is sintered without applying pressure, excellent magnetic characteristics based on the non-equilibrium or metastable state may be degraded.

To solve this problem, a method for fusing a melt spun powder by plastic deformation has been proposed. This method comprises the steps of: charging a melt spun powder of a rare earth-iron-boron material into the cavity of a graphite mold; fixing the melt spun powder by hot pressing with an induction heating system, thereby causing the plastic deformation of the melt spun powder together with the diffusion of atoms at the interface between the adhered powder particles, to form a bulk permanent magnet (Japanese Laid-open Patent Publication No. 60-100402). The degree of fixation depends on the viscosity of the melt spun powder. When a melt spun powder having a lower viscosity is used, a higher degree of fixation can be obtained. However, it is necessary to heat the melt spun powder to a temperature higher than or equal to the crystallization temperature, for example, 600° C. to 900° C., for the purpose of attaining a sufficient decrease in the viscosity. Usually, several hours are required for heating the melt spun powder up to such a high temperature, after charging the powder into the cavity of a mold. The heating procedure for a long period of time may lead to a decrease in the productivity. Also, because the melt spun powder reaches an equilibrium state, excellent characteristics based on the non-equilibrium or metastable state may be degraded. Moreover, when the melt spun powder is simply compressed in the cavity of a mold, a high pressure of 1 to 3 ton/cm$^2$ must be applied in order to combine the powder particles with each other, because the surface of the powder particles does not have a low enough potential energy. Therefore, in this case, the durability of the mold will be decreased. In addition, the bulk permanent magnet prepared by the use of such a graphite mold does not have high dimensional precision. Therefore, the resulting bulk permanent magnet formed into a near net shape must be further processed by grinding.

SUMMARY OF THE INVENTION

The process for producing a rare earth-iron-boron magnet of this invention, which overcomes the above-discussed and numerous other disadvantages and deficiencies of the prior art, comprises the steps of: charging a melt spun powder of a rare earth-iron-boron material into at least one cavity, wherein the cavity is formed between a pair of electrodes which are inserted into a through hole provided in an electrically non-conductive ceramic die; subjecting the melt spun powder to a non-equilibrium plasma treatment, while applying a uniaxial pressure of 200 to 500 kgf/cm$^2$ to the melt spun powder in the direction connecting electrodes interposed between a pair of heat-compensating members under a reduced atmosphere of $10^{-1}$ to $10^{-3}$ Torr, thereby causing the fixation of the melt spun powder; and heating the melt spun powder thus fixed to a temperature higher than or equal to the crystallization temperature thereof by transferring a Joule's heat generated in the thermally insulating members when a current is allowed to pass through the members to the melt spun powder, thereby causing the plastic deformation of the melt spun powder to form a rare earth-iron-boron magnet.

In a preferred embodiment, the aforementioned electrodes have a $\rho/s{\cdot}c$ value in the order of $10^{-5}$–$10^{-4}$, and the aforementioned thermally insulating members have a $\rho/s{\cdot}c$ value in the order of $10^{-3}$, where $\rho$ is the specific resistance, s the specific gravity, and c the specific heat. If such electrodes and thermally insulating members are used, it is possible to heat the melt spun powder more uniformly. This is because when the value of current flowing through the electrodes is varied, the Joule's heat generated in the thermally insulating members can be transferred uniformly to the melt spun powder.

In a preferred embodiment, a plurality of the electrically non-conductive ceramic dies having at least one pair of electrodes are stacked up on each other in the direction of applying the uniaxial pressure with each of the ceramic dies placed between a pair of thermally insulating members. If a mold having such a constitution is employed, it is possible to raise the productivity.

In a preferred embodiment, the aforementioned rare earth-iron-boron material contains 13% to 15% of rare earth elements including yttrium (Y), 0% to 20% of cobalt (Co), 4% to 11% of boron (B), and the balance of iron (Fe) and impurities.

Thus, the invention described herein makes possible the objectives of (1) providing a process for producing a rare earth-iron-boron magnet, by which a plurality of bulk permanent magnets can be prepared directly from a melt spun powder of a rare earth-iron-boron material; (2) providing a process for producing a rare earth-iron-boron magnet, in which the resulting bulk permanent magnets are magnetically isotropic, although they have a lower residual induction than that of permanent magnets prepared by non-pressure sintering, so that they are suitable for radial-directional magnetization; (3) providing a process for producing a rare earth-iron-boron magnet, which does not require a subsequent processing of the resulting bulk permanent magnets by grinding, thereby increasing the productivity; (4) providing a process for producing a rare earth-iron-boron magnet which can provide bulk permanent magnets without degrading the excellent characteristics of a melt spun powder based on the non-equilibrium or metastable state; (5) providing a process for producing a rare earth-iron-boron magnet, which can provide a plurality of bulk permanent magnets having a density close to the theoretical value at a time, thereby attaining the same productivity as that of resin bonded magnets; and (6) providing a process for producing a rare earth-iron-boron magnet, which can provide bulk permanent magnets having quite excellent magnetic characteristics as compared with resin bonded magnets.

BRIEF DESCRIPTION OF THE DRAWING

This invention may be better understood and its numerous objectives and advantages will become apparent to those skilled in the art by reference to the accompanying drawing as follows.

DESCRIPTION OF THE PREFERRED EMBODIMENT

Figure 1:
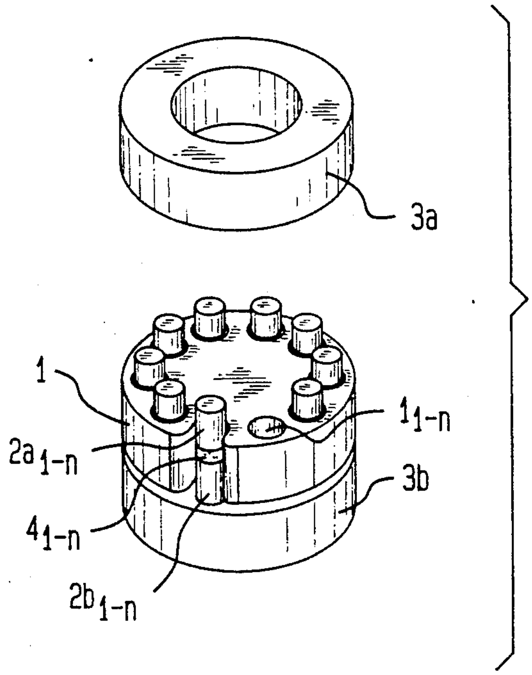
FIG. 1 is a partially-outaway perspective view showing a mold used in the process for producing a rare earth-iron-boron magnet of this invention.

In the process of this invention, a bulk permanent magnet is prepared directly from a melt spun powder of a rare earth-iron-boron material. The rare earth-iron-boron material which can be used in the process of this invention preferably contains 13% to 15% of rare earth elements including yttrium (Y), 0% to 20% of cobalt (Co), 4% to 11% of boron (B), and the balance of iron (Fe) and impurities. Examples of the rare earth elements other than yttrium include neodymium (Nd) and praseodymium (Pr), which can provide a melt spun powder having a high coercive force.

When the amount of rare earth elements is less than 13%, the resulting melt spun powder will have not only a low coercive force but also a high deformation resistance. Thus, a bulk permanent magnet with a high induction cannot be obtained from such a melt spun powder. On the other hand, when the amount of rare earth elements is more than 15%, the melt spun powder will have a reduced saturation magnetization. Also, when a pressure is applied to the melt spun powder in the process of this invention, because an excess amount of rare earth elements causes the formation of flash or fin, the operation will have some difficulty for producing a bulk permanent magnet.

Although the inclusion of cobalt instead of a certain amount of iron increases the Curie point of the melt spinning powder, when more than 20% of cobalt is added, a melt spinning powder having a high coercive force cannot be obtained.

The amount of boron is preferably 4% to 11% in order to obtain the excellent magnetic characteristics derived from the $R_2TM_{14}B$ phase present in the melt spinning powder, wherein R is a rare earth element including yttrium, and TM is iron and/or cobalt. More preferably, the amount of boron is set to about 6% because it is possible to obtain a melt spinning powder with the minimum plastic deformation resistance.

The following will describe a mold used in the process of this invention by reference to the accompanying figure.

FIG. 1 shows a mold used in the process of this invention. With the use of this mold, a plurality of bulk permanent magnets with high dimensional precision can be prepared directly from a melt spun powder without losing the excellent magnetic characteristics based on the non-equilibrium or metastable state. The mold is comprised of an electrically non-conductive ceramic die 1 having at least one through hole $\mathbf{1}_{1-n}$, at least one pair of electrodes $\mathbf{2a}_{1-n}$ and $\mathbf{2b}_{1-n}$, and a pair of thermally insulating members 3a and 3b. The electrodes $\mathbf{2a}_{1-n}$ and $\mathbf{2b}_{1-n}$ are inserted into the through holes $\mathbf{1}_{1-n}$ to form cavities. These electrodes also function as upper and lower punches. The surface of the electrodes $\mathbf{2a}_{1-n}$ and $\mathbf{2b}_{1-n}$ forming cavities are desirably coated with a layer containing boron nitrate powder. The electrically non-conductive ceramic die 1 having the electrodes $\mathbf{2a}_{1-n}$ and $\mathbf{2b}_{1-n}$ are placed between two thermally insulating members 3a and 3b. A melt spun powder $\mathbf{4}_{1-n}$ which is to be formed into a bulk permanent magnet is charged into the cavities.

The following will describe the process of this invention by using the above-mentioned mold.

First, the melt spun powder $\mathbf{4}_{1-n}$ is charged into the cavities between at least one pair of electrodes $\mathbf{2a}_{1-n}$ and $\mathbf{2b}_{1-n}$. After the electrically non-conductive ceramic die 1 having the electrodes $\mathbf{2a}_{1-n}$ and $\mathbf{2b}_{1-n}$ are placed between two thermally insulating members 3a and 3b, a uniaxial pressure of 200 to 500 kgf/cm$^2$ per cross area of the electrodes $\mathbf{2a}_{1-n}$ and $\mathbf{2b}_{1-n}$ in the direction connecting these electrodes is applied under a reduced atmosphere of $10^{-1}$ to $10^{-3}$ Torr, thereby reducing the surface potential energy of the melt spun powder $\mathbf{4}_{1-n}$.

Then, the melt spun powder $\mathbf{4}_{1-n}$ is subjected to a non-equilibrium plasma treatment. The non-equilibrium plasma is a plasma with a much lower gas temperature than the electron temperature. The plasma is generated by applying a DC voltage between the electrodes $\mathbf{2a}_{1-n}$ and $\mathbf{2b}_{1-n}$ under a reduced atmosphere of $10^{-1}$ to $10^{-3}$ Torr. The electrolytic gas present in the plasma contains a large number of active atoms, molecules, ions, free electrons, radicals, and the like. The electron temperature is increased to about $10^4$° C. by the acceleration of the electrons under an electric field, whereas the temperatures of the atomic species and molecular species which have relatively larger masses are increased to only about 100° C. to 200° C. When a solid material is treated with the non-equilibrium plasma, its surface temperature depends on the temperatures of the atoms and molecules present in the plasma, i.e., its gas temperature. Therefore, the melt spun powder $\mathbf{4}_{1-n}$ which is being treated with the non-equilibrium plasma cannot reach the temperature of plastic deformation, or the temperature at which the atoms can be diffused on its surface. However, electrons, ions, excited species, and other active chemical species present in the plasma, which have a certain amount of kinetic energy, may collide with the surface of the melt spun powder $\mathbf{4}_{1-n}$, so that these active chemical species react with contaminants and low molecular weight compounds adhered to the surface of the melt spun powder $\mathbf{4}_{1-n}$, thereby causing the further reduction of the potential energy of the melt spun powder $4_{1-n}$, which is called an etching effect.

After the melt spun powder $4_{1-n}$ is treated with the non-equilibrium plasma as described above, a current is allowed to pass through the melt spun powder $4_{1-n}$ by way of the electrodes $2a_{1-n}$ and $2b_{1-n}$ from the side faces of the thermally insulating members 3*a* and 3*b*, under a reduced atmosphere and pressure, thereby causing the generation of a Joule's heat in the thermally insulating members 3*a* and 3*b*. The Joule's heat is then transferred to the melt spun powder $4_{1-n}$. The rate of temperature increase ΔT/Δt (°C./sec) in the electrodes $2a_{1-n}$ and $2b_{1-n}$, and in the melt spun powder $4_{1-n}$, is determined by the formula:

$$\Delta T/\Delta t = \frac{0.2389 \times I^2 R}{C} = \frac{0.2389 \times I^2 l\rho/\pi r^2}{\pi r^2 lsc} = \frac{0.2389 \times I^2 \rho}{\pi^2 r^4 sc}$$

where I is the current value (A), R is the electric resistance (Ω), C. is the heat capacity (cal/°C.), c is the specific heat (cal/°C.·g), s is the specific gravity, ρ is the specific resistance (Ω·cm), l is the length (cm) along the direction of applying a uniaxial pressure, and r is the diameter (cm) of a cross section perpendicular to the direction of applying a uniaxial pressure.

As seen from the above formula, the rate of temperature increase ΔT/Δt equals $(\Delta i)^2 \rho/s\cdot c$, where Δi is the current density ($A/cm^2$). Thus, it can be seen that the rate of temperature increase ΔT/Δt is independent of the length l (cm), but proportional to a square of the current density Δi ($A/cm^2$) as well as to the specific resistance ρ(Ω·cm), and inversely proportional to the specific heat c (cal/°C.·g) and the specific gravity s.

The melt spun powder $4_{1-n}$ has a ρ/s·c value in the order of $2.7\times10^{-4}$ at the initial stage. The electrodes $2a_{1-n}$ and $2b_{1-n}$ have a slightly lower ρ/s·c value in the order of $2.7\times10^{-4}$ or $10^{-5}$, and the thermally insulating members 3*a* and 3*b* have a ρ/s·c value in the order of $10^{-3}$. When a current is allowed to pass through the melt spun powder $4_{1-n}$, it does not necessarily flow uniformly because of the contact resistance in the electrodes. Therefore, the melt spun powder $4_{1-n}$ does not have a constant rate of temperature increase. However, when the electrodes $2a_{1-n}$ and $2b_{1-n}$, and the thermal compensating members 3*a* and 3*b* having the aforementioned ranges of ρ/s·c values are used, the Joule's heat to be transferred is corrected, thereby providing the melt spun powder $4_{1-n}$ with a constant rate of temperature increase.

The rate of temperature increase of the melt spun powder $4_{1-n}$ depends mainly on the Joule's heat generated in the thermal compensating members 3*a* and 3*b* when a current is applied. The melt spun powder $4_{1-n}$ is heated to a temperature higher than the crystallization temperature thereof by transferring the Joule's heat, thereby causing the plastic deformation at a strain rate of $10^{-1}$ to $10^{-2}$ mm/sec or more. The strain rate of the melt spun powder $4_{1-n}$ is increased with a decrease in the viscosity thereof and with an increase in the relative density thereof; once it reaches a peak level and then gradually decreases. When the relative density of the melt spun powder $4_{1-n}$ is more than 90%, the strain rate is already decreased from its peak level. However, the current is applied until the strain rate reaches $10^{-3}$ mm/sec or less. Although the current is shut off at the time that the strain rate becomes $10^{-3}$ mm/sec or less, the pressure and reduced atmosphere are still maintained until the outer surface temperature of the non-conductive ceramic die 1 is decreased. Thus, the rare earth-iron-boron magnets having the excellent magnetic characteristics based on the non-equilibrium or metastable state, as well as densification, can be obtained as bulk permanent magnets. With the use of a mold as shown in FIG. 1, n bulk permanent magnets are prepared at a time, thereby attaining high productivity.

The resulting rare earth-iron-boron magnets are released from the non-conductive ceramic die 1 by use of a difference in the thermal expansion therebetween when cooled in the cavities. If the surfaces of the electrodes $2a_{1-n}$ and $2b_{1-n}$ which forms a cavity are coated with a layer containing boron nitride powder (i.e., releasing film), the magnets can also be released readily, because the boron nitride powder is transferred to the surface of the magnets.

The melt spun powder of a rare earth-iron-boron material which can be used in this invention is prepared by a well-known rapid solidification technique such as a melt spinning technique. The particle size of the melt spun powder is not particularly limited, but the amount of fine melt spun powder having a particle size of 53 μm or less is preferably reduced, because it only provides a rare earth-iron-boron magnet having a lower coercive force.

Examples of the materials used for the electrodes include a hard metal alloy G5 defined by the specification of JIS H5501. Examples of the materials used for the thermally insulating members include graphite and various ceramic composites obtained by adding to SiC, about 30% to 50% by volume of at least one compound selected from the group consisting of TiC, TiN, ZnC, WC, $ZrB_2$, $HfB_2$, $NbB_2$ and $TaB_2$, and sintering the mixture. Since the electrically non-conductive ceramic die has a small coefficient of thermal conductivity, it provides a high thermal efficiency by the prevention of current and heat leaks. Also, the electrically non-conductive ceramic die is required to have excellent properties such as thermal shock resistance, inactivity to the melt spun powder, wear resistance, low thermal expansion coefficient, strength at high temperatures, and low heat capacity. Examples of the materials used for the electrically non-conductive ceramic die include sialon which is a composite of silicon nitride and alumina.

The invention will be further illustrated by reference to the following examples, but these examples are not intended to restrict the invention.

EXAMPLE 1

First, a rare earth-iron-boron material containing 13% of Nb, 68% of Fe, 18% of Co, and 6% of B was melted by high-frequency heating under an atmosphere of argon gas, and then sprayed onto a copper single roller at a peripheral velocity of about 50 m/sec by a melt spinning technique to obtain a melt spun powder in the form of a flake having a thickness of 20 to 30 μm. It was confirmed by X-ray diffraction that the melt spun powder was formed by solidifying the melted alloy without causing its crystallization.

The melt spun powder in the non-equilibrium state was then ground to a particle size range between 53 μm and 350 μm. A part of the melt spun powder having the adjusted particle size was magnetized with a pulsed magnetic field of 50 kOe. The intrinsic coercive force of the melt spun powder thus magnetized was measured to be 5.8 kOe with a vibrating sample magnetometer (VSM).

On the other hand, a part of the melt spun powder having the adjusted particle size in the non-equilibrium state was heat-treated at a temperature of 650° C. to 700° C. under an atmosphere of argon gas. The presence of a $R_2Fe_{14}B$ phase in the heat-treated melt spun powder was confirmed by X-ray diffraction. The melt spun powder was then magnetized with a pulsed magnetic field of 50 kOe, as described above. The intrinsic coercive force of the melt spun powder thus magnetized was measured to be 16.5 kOe with a vibrating sample magnetometer (VSM). The resulting melt spun powder is referred to as a metastable rapid solidification powder in contrast with the melt spun powder in the non-equilibrium state.

Appropriate amounts of the melt spun powder in the non-equilibrium state and the metastable melt spun powder were independently weighed and charged into the cavities between the electrodes $2a_{1-n}$ and $2b_{1-n}$, as shown in FIG. 1. The electrically non-conductive ceramic die 1 had through holes $1_{1-n}$ having a diameter of 14 mm. The electrodes $2a_{1-n}$ and $2b_{1-n}$ were inserted into the respective through holes $1_{1-n}$ to form the cavities. Also, the electrically non-conductive ceramic die 1, and the electrodes $2a_{1-n}$ and $2b_{1-n}$ forming the cavities were placed between the two thermally insulating members 3a and 3b. A plurality of bulk permanent magnets were prepared from the melt spun powder $4_{1-n}$ which had been charged into the cavities according to the following procedure.

In this example, the subscript "n" was 10, and therefore, ten cavities were formed by inserting the electrodes $2a_{1-n}$ and $2b_{1-n}$ into the through holes $1_{1-n}$. The electrodes $2a_{1-n}$ and $2b_{1-n}$ also functioned as upper and lower punches, respectively. The electrodes $2a_{1-n}$ and $2b_{1-n}$ were made of a hard metal alloy G5 defined by the specification of JIS H5501, or a SiC/TiC ceramic composite containing a certain amount of TiC. The surface of the electrodes $2a_{1-n}$ and $2b_{1-n}$ forming the cavities had been previously coated with a layer containing boron nitride powder. Also, the electrically non-conductive ceramic die was made of sialon. The thermally insulating members 3a and 3b were made of graphite or an SiC/TiC ceramic composite containing a certain amount of TiC.

Next, a uniaxial pressure of 200 to 500 kgf/cm$^2$ per cross-sectional area of the electrodes $2a_{1-n}$ and $2b_{1-n}$ perpendicular to the direction connecting these electrodes was applied to the melt spun powder $4_{1-n}$ under a reduced atmosphere of $10^{-1}$ to $10^{-3}$ Torr. Then, the melt spun powder $4_{1-n}$ was subjected to a non-equilibrium plasma treatment by applying a DC voltage of 10 V having a pulse length of 20 msec between the electrodes $2a_{1-n}$ and $2b_{1-n}$ for zero to 90 seconds, while keeping the reduced atmosphere and pressure constant. Subsequently, a DC current of 300 to 350 A/cm$^2$ per cross-sectional area of the electrodes $2a_{1-n}$ and $2b_{1-n}$ perpendicular to the direction connecting these electrodes was allowed to pass through the melt spun powder $4_{1-n}$ by way of these electrodes from the sides of the thermally insulating members 3a and 3b for 40 to 500 seconds. At that time, the melt spun powder $4_{1-n}$ present in the cavities was heated and compressed in the direction of applying the pressure. The strain rate was determined by obtaining the value of displacement of the melt spun powder $4_{1-n}$ thus heated, and then differentiating the value. The viscosity of the melt spun powder $4_{1-n}$ was rapidly reduced by heating and application of a constant pressure, whereas the strain rate was increased. However, when the relative density of the melt spun powder $4_{1-n}$ exceeded 90%, the strain rate started decreasing with an increase in the relative density. The current was shut off at a time that the strain rate became $10^{-3}$ mm/sec or less. When the outer surface temperature of the electrically non-conductive ceramic die 1 started decreasing, the pressure and the reduced atmosphere were released. In this way, ten bulk permanent magnets having a diameter of 14 mm and a height of 2 mm were obtained directly from a melt spun powder of a rare earth-iron-boron material.

Table 1 shows the relationship between the non-equilibrium plasma treatment time and the intrinsic coercive force of the bulk permanent magnets prepared from either the melt spun powder in the non-equilibrium state or the metastable melt spun powder in the case where the electrodes had a $\rho$/s·c value in the order of $10^{-5}$, and the thermally insulating members had a $\rho$/s·c value in the order of $10^{-3}$, where $\rho$ is the specific resistance (Ω·cm), s is the specific gravity, and c is the specific heat (cal/°C.·g). As can be seen from the table, a bulk permanent magnet having an intrinsic coercive force of 15 kOe or more can be obtained from either the melt spun powder in the non-equilibrium or the metastable melt spun powder by a non-equilibrium plasma treatment.

TABLE 1

| | | | | |
|---|---|---|---|---|
| Non-equilibrium plasma treatment time (sec) | 0 | 30 | 60 | 90 |
| Intrinsic coercive force of a bulk-like permanent magnet obtained from melt spinning powder in the non-equilibrium state (kOe) | 8.8 | 16.8 | 17.2 | 17.4 |
| Intrinsic coercive force of a bulk-like permanent magnet obtained from metastable melt spun powder (kOe) | 7.5 | 15.7 | 16.6 | 17.0 |

Table 2 shows the relationship between the current-applying time, and the intrinsic coercive force and residual induction of the bulk permanent magnet in the case where the electrodes had a $\rho$/s·c value in the order of $10^{-3}$ to $10^{-5}$, and the thermally insulating members had a $\rho$/s·c value in the order of $10^{-3}$ to $10^{-4}$, where $\rho$ is the specific resistance (Ω·cm), s is the specific gravity, and c is the specific heat (cal/°C.·g). As can be seen from the table, a bulk permanent magnet having stable magnetic properties can be obtained when the electrodes having a $\rho$/s·c value in the order of $10^{-4}$, and the thermally insulating members having a $\rho$/s·c value in the order of $10^{-3}$ are used with a relatively short current-applying time according to the method of this invention.

TABLE 2

| | Ex. | Comp. Ex. 1 | Comp. Ex. 2 | Comp. Ex. 3 |
|---|---|---|---|---|
| $\rho$/s · c value of thermal insulating members | $10^{-3}$ | $10^{-3}$ | $10^{-4}$ | $10^{-4}$ |
| $\rho$/s · c value of electrodes | $10^{-4}$ | $10^{-3}$ | $10^{-4}$ | $10^{-3}$ |
| Current-applying | 70-80 | 30-60 | 450-500 | 50-70 |

TABLE 2-continued

| | Ex. | Comp. Ex. 1 | Comp. Ex. 2 | Comp. Ex. 3 |
|---|---|---|---|---|
| time (sec) | | | | |
| Intrinsic coercive force of bulk-like permanent magnet (kOe) | 16–17 | 11–14 | 9–14 | 9–17 |
| Residual induction of bulk-like permanent magnet (kG) | 8.3–8.4 | 7.9–8.0 | 7.8–8.0 | 7.9–8.2 |

When the electrodes having a $\rho/s\cdot c$ value in the order of $10^{-4}$ and the thermally insulating members having a $\rho/s\cdot c$ value in the order of $10^{-3}$ were used as described in Table 2, a bulk permanent magnet having an outer diameter of 14.000±0.01 mm, a height of 2.00±0.05 mm, and a density of 7.68 to 7.70 g/cm$^3$, was obtained.

EXAMPLE 2

Twenty bulk permanent magnets were prepared in the same manner as that of Example 1, except that two molds as shown in FIG. 1 were stacked up on each other in the direction of applying a uniaxial pressure with each of the electrically non-conductive ceramic dies placed between a pair of thermally insulating members. The bulk permanent magnets obtained by applying a current for the same period of time as that of Example 1, had substantially the same magnetic properties, dimensional precision, and density as those of Example 1.

It is understood that various other modification will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A process for producing a rare earth-iron-boron magnet comprising the steps of:

charging a melt spun powder of a rare earth-iron-boron material into at least one cavity, wherein said cavity is formed between a pair of electrodes which are inserted into a through hole provided in an electrically non-conductive ceramic die;

subjecting said melt spun powder to a non-equilibrium plasma discharge treatment by applying a direct current pulse voltage whereby active chemical species in the plasma react with contaminants and low molecular weight compounds adhered to the surface of said melt-spun powder to cause an etching effect, while applying a uniaxial pressure of 200 to 500 kgf/cm$^2$ to said melt spun powder in the direction connecting said electrodes interposed between a pair of thermally insulating members under a reduced atmosphere of $10^{-1}$ to $10^{-3}$ Torr, thereby fusing said melt spun powder; and heating said melt spun powder thus fused to a temperature higher than or equal to the crystallization temperature thereof by transferring a Joule's heat generated in said thermally insulating members when a D.C. current is allowed to pass through said members to said melt spun powder, thereby causing the plastic deformation of said melt spun powder to form a rare earth-iron-boron magnet;

wherein said electrodes have a $\rho/s\cdot c$ value on the order of $10^{-5}$–$10^{-4}$ and said thermally insulating members have a $\rho/s\cdot c$ value on the order of $10^{-3}$, where $\rho$ is the resistivity, s the specific gravity, and c the specific heat; and wherein a plurality of said electrically non-conductive ceramic dies having at least one pair of electrodes are stacked up on each other in the direction of applying said uniaxial pressure with each of said ceramic dies placed between a pair of thermally insulating members.

2. A process according to claim 1, wherein said rare earth-iron-boron material contains 13% to 15% of rare earth elements including yttrium (Y), 0% to 20% of cobalt (Co), 4% to 11% of boron (B), and the balance of iron (Fe) and impurities.

* * * * *